Patented May 7, 1929.

1,712,404

UNITED STATES PATENT OFFICE.

VIRGIL R. RUPP, OF NEW YORK, N. Y.

MINERAL FEED AND PROCESS OF MAKING SAME.

No Drawing.    Application filed January 27, 1928.  Serial No. 250,091.

This invention relates to a mineral feed and a process of preparing same.

A useful ingredient in such a mineral feed is sodium sulfate, commonly called salt cake. A common method of preparing this salt cake is to treat common salt or sodium chloride with sulphuric acid in sufficient quantities in order to produce the following reactions.

$$NaCl + H_2SO_4 = NaHSO_4 + HCl$$
$$NaHSO_4 + NaCl = Na_2SO_4 + HCl$$

The reaction in Equation 1 occurs readily when mixing the two ingredients, the hydrochloric acid passing off as a gas, while the sodium bi-sulfate remains. The second reaction indicated in Equation 2 occurs only on the application of considerable heat and as a consequence the sodium sulfate salt sells at a considerably higher price than the bi-sulfate or the acid sodium sulfate, commonly called nitre cake.

Rock phosphate contains a quantity of fluorine which if taken internally would be injurious to the animals or poultry. In order to reduce the quantity of fluorine contained in the raw rock phosphate, the phosphate is treated with sulphuric acid whereby a greater proportion of the fluorine is driven off and the rock phosphate is converted into an acid phosphate which is soluble in water and, therefore, more suitable to feed the animals.

An object of the present invention is to provide a mineral food which has not only a reduced percentage of the normal quantity of fluorine in the rock phosphate, but to provide a binder of calcium sulfate and to reduce the number of steps in the removal of the fluorine and also for the formation of the calcium sulfate.

A further object of the invention is the provision of a process for forming an acid phosphate from a sodium acid sulfate simultaneously with the binder such as calcium sulfate, and in which the fluorine content of the rock phosphate is reduced from more than three per cent by weight in certain samples of raw rock phosphate, to less than one per cent on the basis of the phosphate present in the ingredients in a heated mixture, as described below.

In carrying out my invention instead of heating together sodium acid sulfate and sodium chloride to form salt cake, and heating rock phosphate with sulphuric acid to remove fluorine and make the phosphate more soluble, I combine these two processes to obtain approximately the same results. Instead of heating the sodium bi-sulfate with common salt as disclosed in the second equation of the preparation of the salt cake, the rock phosphate is heated with the sodium bi-sulfate. The action may be represented by the following equation.

$$Ca_3(PO_4)_2 + 4NaHSO_4 \rightarrow 2Na_2SO_4 + CaH_4(PO_4)_2 + 2CaSO_4$$

Thus, in heating the fluorine, which is not taken into consideration in the equation, is eliminated and part of the rock phosphate is rendered soluble in water. It will also be noted, that one of the products, calcium sulphate, is obtained simultaneously with the acid phosphate, and this is employed as a binder during the manufacture of the materials in pellet form.

A particular example in carrying out my process is as follows:

One part of rock phosphate is intimately mixed with two parts of the sodium bi-sulfate. This mixture is then heated in a rotary kiln or a kiln similar to the kind used in preparing salt cake, or the mixture may be heated in any type of furnace suitable for the purpose. A temperature preferably of 300° C. is maintained to provide for the melting of the sodium bi-sulfate, and also for the elimination of fluorine, although fluorine gas is evolved at lower temperatures.

The proportions by weight of the materials stated above are only approximate and may be varied to obtain effective results.

Temperatures above 300° C. may be employed, when the temperature of approximately 500° C. or more is employed, a beautiful white powder results containing very little of so-called free acid. However, when the mixture is maintained at approximately 500° C. or more, the resulting product loses considerable of its coherent properties so that when it is mixed with other mineral elements, about to be described, it will not so well maintain a state of division in pellet form and is inclined to be reduced to a powder unless some other adhesive is employed.

After the heating has been maintained for a predetermined time, the mixture is then cooled and preferably ground and mixed in the following proportions with certain other mineral elements.

| | Parts. |
|---|---|
| Nitre cake rock phosphate mixture | 50 |
| Limestone | 20 |
| Charcoal | 20 |
| Common salt | 10 |

When limestone is used as one of the elements it not only supplies calcium but aids in neutralizing any free acids present.

When water is added to the above mixture in sufficient quantity to produce a semi-pasty mass, this mass can be formed into pellets which are ultimately dried. In the preparation of the pellets a device similar to the ordinary meat grinder is employed, or some other form which is capable of forming strings of the paste which is cut in any suitable manner into small particles or pellet like form, the size of the particles or pellets, of course, being varied to suit the particular needs for which the mineral food is adapted to be employed. In making a mineral food for hogs, strings of the pasty mass are cut into sizes approximating a grain of corn.

The pellet like form produced from the paste are particularly efficacious, due to the fact that they are maintained in granular form for in such condition they will not be readily blown away when placed in an animal feeder and, furthermore, they not only present a better appearance, but are more easily handled. In the present process the single step of heating the sodium bi-sulfate with rock phosphate eliminates in one operation, the greater per cent of the fluorine contained in the rock phosphate, while not only rendering the phosphate more available as a food but providing simultaneously a binder in the form of calcium sulfate.

I claim:—

1. The process of preparing a mineral food which consists of heating together an acid sulfate and rock phosphate.

2. A process of preparing a mineral food which consists in heating an intimate mixture of acid sulfate and rock phosphate, and converting the rock phosphate and the acid sulfate into an acid phosphate and a binder of calcium sulfate.

3. A process of preparing a mineral food which comprises heating a mixture of acid sulfate and rock phosphate to a temperature above 300° C., cooling the mixture of the compounds thus formed and adding additional mineral matter.

4. A process of preparing a mineral food which comprises heating a mixture of acid sulfate and rock phosphate to a temperature above 300° C., cooling the mixture of the compounds thus formed and adding other mineral matter and water in sufficient quantity to form a semi-pasty mass, dividing the mass into particles and drying the separate particles.

5. A process of preparing a mineral food which comprises heating rock phosphate having a fluorine content with acid sulfate to form a binder and an acid calcium phosphate, while at the same time driving off the fluorine content of the rock phosphate.

6. A process of preparing a mineral food which comprises heating rock phosphate having a fluorine content with acid sulfate to form a binder and an acid calcium phosphate, while at the same time driving off the fluorine content of the rock phosphate, cooling the mixture of the compound thus formed and intimately mixing with the cooled mixture, water, limestone, charcoal and salt to form a paste.

7. A process of preparing a mineral food which comprises heating rock phosphate having a fluorine content, with bi-sulfate of soda to form a binder in the form of calcium sulfate, and an acid calcium phosphate, while at the same time driving off the fluorine content of the rock phosphate.

8. A mineral food comprising a binder such as calcium sulfate and an acid calcium phosphate formed from rock phosphate and an acid sulfate, said food also including limestone, charcoal and salt.

Signed at New York in the county of New York and State of New York this 20th day of January, A. D. nineteen hundred and twenty-eight.

VIRGIL R. RUPP.